(12) United States Patent
Maguire et al.

(10) Patent No.: US 9,323,428 B1
(45) Date of Patent: Apr. 26, 2016

(54) ON-BOARDING FRAMEWORK

(71) Applicant: BANK OF AMERICA CORPORATION, Charlotte, NC (US)

(72) Inventors: Matthew Maguire, Fort Mill, SC (US); Arun Kallikadavil, Charlotte, NC (US); Hope A. Christopher, Charlotte, NC (US); Praveen Gudapati, New York, NY (US); Adam S. Martin, Charlotte, NC (US); Navneet Purohit, East Brunswick, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 174 days.

(21) Appl. No.: 13/952,295

(22) Filed: Jul. 26, 2013

(51) Int. Cl.
G06F 3/048 (2013.01)
G06F 3/0484 (2013.01)

(52) U.S. Cl.
CPC .................................. G06F 3/0484 (2013.01)

(58) Field of Classification Search
USPC .......................................................... 715/733
See application file for complete search history.

(56) References Cited

U.S. PATENT DOCUMENTS

| | | | |
|---|---|---|---|
| 5,799,297 A | 8/1998 | Goodridge et al. | |
| 5,826,250 A | 10/1998 | Trefler | |
| 7,017,142 B1 | 3/2006 | Ehnebuske et al. | |
| 7,257,579 B2 * | 8/2007 | Wachholz-Prill | G06Q 10/06 |
| 7,607,130 B2 | 10/2009 | Singh et al. | |
| 7,665,063 B1 | 2/2010 | Hofmann et al. | |
| 7,930,268 B2 | 4/2011 | Starkey et al. | |
| 8,046,238 B2 * | 10/2011 | Solomon ............ | G06Q 10/0631 705/1.1 |
| 8,335,704 B2 | 12/2012 | Trefler et al. | |
| 8,341,598 B2 | 12/2012 | Peck et al. | |
| 2003/0061058 A1* | 3/2003 | Dutta ..................... | G06Q 10/06 705/311 |
| 2003/0115198 A1* | 6/2003 | Singer ............... | G06Q 10/0639 |
| 2008/0162396 A1* | 7/2008 | Kerley .................. | G06N 5/025 706/47 |
| 2008/0208785 A1 | 8/2008 | Trefler et al. | |
| 2008/0262863 A1* | 10/2008 | Stickley ................ | G06F 21/577 705/1.1 |
| 2012/0054230 A1* | 3/2012 | Kanada .......................... | 707/769 |
| 2012/0066679 A1* | 3/2012 | Pappas ................ | G06F 9/45558 718/1 |
| 2013/0024364 A1* | 1/2013 | Shrivastava ............ | G06Q 20/38 705/39 |

OTHER PUBLICATIONS https://clearwatercompliance.com/blog/hipaa-security-risk-analysis-tips-take-risk-analysis-quiz/HIPAA Security Risk Analysis Tips—Take Risk Analysis Quiz. Bob Chaput, Dec. 9, 2012.*
http://www.wbctx.com/subcontractor_questionnaire.cfm Subcontractor Questionnaire 2009.*

* cited by examiner

*Primary Examiner* — William Bashore
*Assistant Examiner* — Henry Orr
(74) *Attorney, Agent, or Firm* — Michael A. Springs; Moore & Van Allen PLLC; Jeffrey R. Gray

(57) ABSTRACT

The on-boarding framework consolidates and ensures consistent implementation of business compliance with regulatory policy across a global business that is required to comply with regulations of international, regional, country specific, local jurisdictions, or the like. The on-boarding framework facilitates the work flow, approvals, documents, reporting, and other information using dynamic rules that dictate the on-boarding elements based on customer type, booking entity, location of the authorized approval, special products, data collected, and the like, which are used to dynamically evaluate the client's on-boarding potential regulatory issues, and the actions used to mitigate potential regulatory issues with the entity being on-boarded.

18 Claims, 11 Drawing Sheets

ON-BOARDING FRAMEWORK

U.S. patent application Ser. No. 13/952,258 to Kallikadavil et al., entitled "Integration Framework," and filed concurrently herewith, is hereby incorporated by reference in its entirety.

FIELD

The present invention relates to the field of systems that are used for verifying entities and creating a record of the verification in order to allow an institution to enter into transactions with the entities and for compliance with regulatory bodies.

BACKGROUND

Institutions enter into transactions with various entities all over the world. It is difficult to create systems and applications that can interface with each other to create a uniform workflow and record of the entities because of coding differences, data type differences, varying requirements of users utilizing the systems and applications, regulatory changes, business improvements, process workflow changes, or other like restrictions.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for an application and system integration framework that provides interoperability and scalability for user interfaces and workflow processes within and/or between institutions.

Embodiments of the invention comprise systems, computer program products, and methods for an on-boarding framework invention comprising receiving an indication from a first user of an institution to log into an on-boarding application for on-boarding one or more entities to comply with compliance regulations; identifying an on-boarding template for the on-boarding application; determining first user profile data, wherein the first user profile data comprises a first user type and associated first user style-sheet; displaying an on-boarding interface to the first user based on the first user type and the first user style-sheet; receiving an entity selection from the first user to on-board an entity within the on-boarding interface; determining a plurality of first on-boarding questions and pre-defined answers; displaying the plurality of first on-boarding questions and pre-defined answers in the on-boarding interface based on the template; receiving an action from the first user that answers one or more of the plurality of first on-boarding questions; storing the answers to the one or more of the plurality of first on-boarding questions; determining one or more second on-boarding questions and pre-defined answers based on the answers to one or more of the plurality of first on-boarding questions; and displaying the second one or more questions and pre-defined answers in the template in the on-boarding interface.

In further accord with one embodiment, the invention further comprises receiving an indication from a second user to log into the on-boarding application for on-boarding one or more entities; identifying the on-boarding template for the on-boarding application; determining second user profile data, wherein the second user profile data comprises a second user type and associated second user style-sheet; displaying the on-boarding interface to the second user based on the second user type and the second user style-sheet; receiving the entity selection from the second user to on-board the entity within the on-boarding interface; displaying the plurality of first on-boarding questions and pre-defined answers, the second one or more questions and pre-defined answers, and the answers provided by the first user in the on-boarding interface based on the template; receiving, an action from the second user that answers one or more of the plurality of first or second on-boarding questions, or approves the answers provided by the first user; and storing the answers to one or more of the plurality of first or second on-boarding questions or the approval of the answers provided by the first user.

In another embodiment of the invention, the plurality of questions and pre-defined answers for on-boarding the entity comprise product questions regarding products for which the institution is entering transactions with the entity and regions in which the entity operates.

In still another embodiment of the invention, the plurality of questions and pre-defined answers for on-boarding the entity comprises regulatory questions related to if the entity is regulated by an agency and verification questions related to if the entity is a verified entity.

In yet another embodiment of the invention, determining the plurality of first on-boarding questions and pre-defined answers comprises identifying the questions and pre-defined answers in a data file; identifying a pre-defined answer type in the data file; identifying user entitlements of the first user in the data file; determining the plurality of first on-boarding questions and pre-defined answers based on the user entitlements of the first user in the data file and the first user type; and wherein displaying the plurality of first on-boarding questions and pre-defined answers in the on-boarding interface is based on the pre-defined answer type.

In further accord with an embodiment of the invention, the user profile data includes a language preference, and wherein displaying the on-boarding interface to the first user further comprises displaying the on-boarding interface to the first user based on the language preference.

In another embodiment the invention further comprises receiving documents for on-boarding the entity from the first user; and storing the documents for satisfying the compliance regulations.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
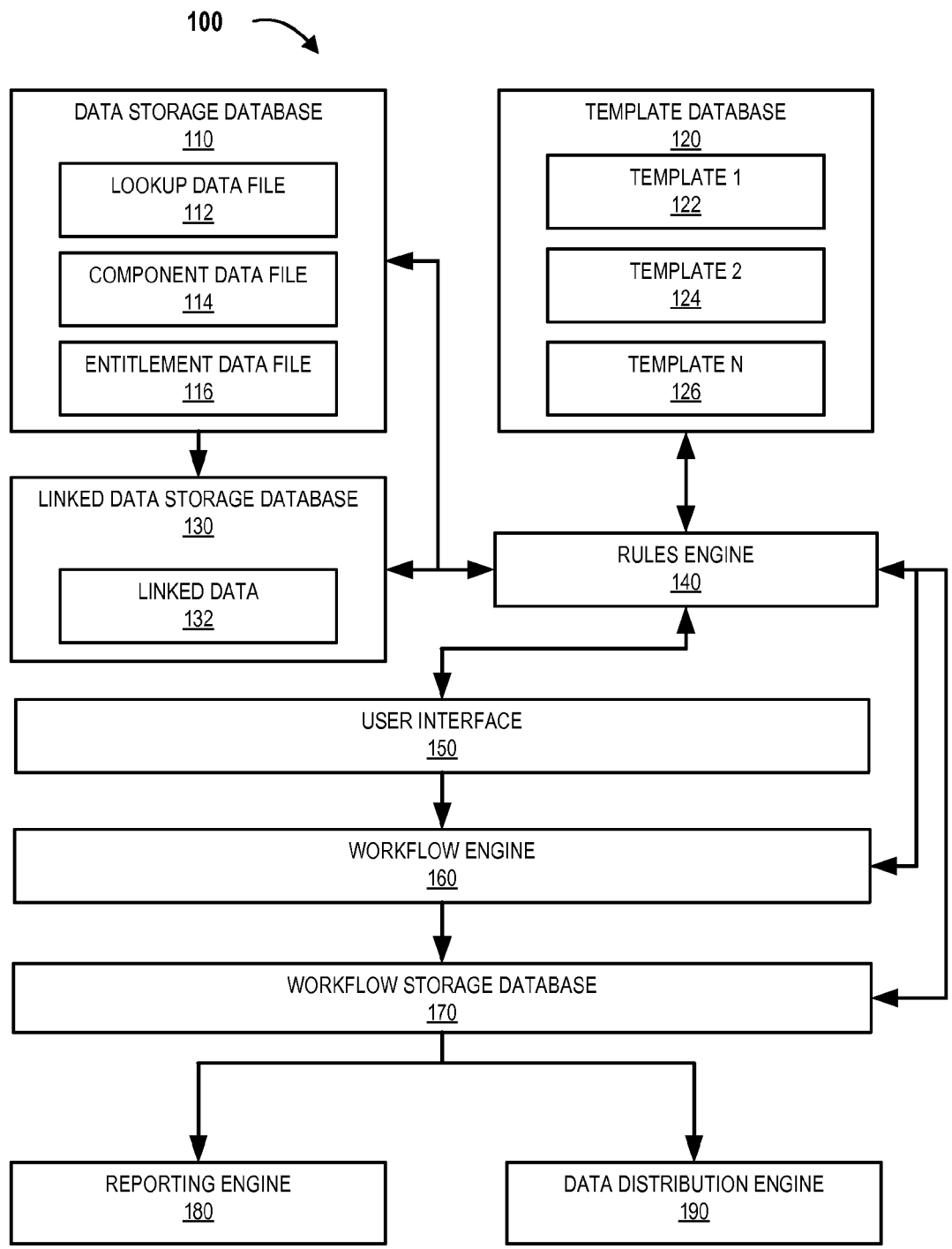
Figure 2:
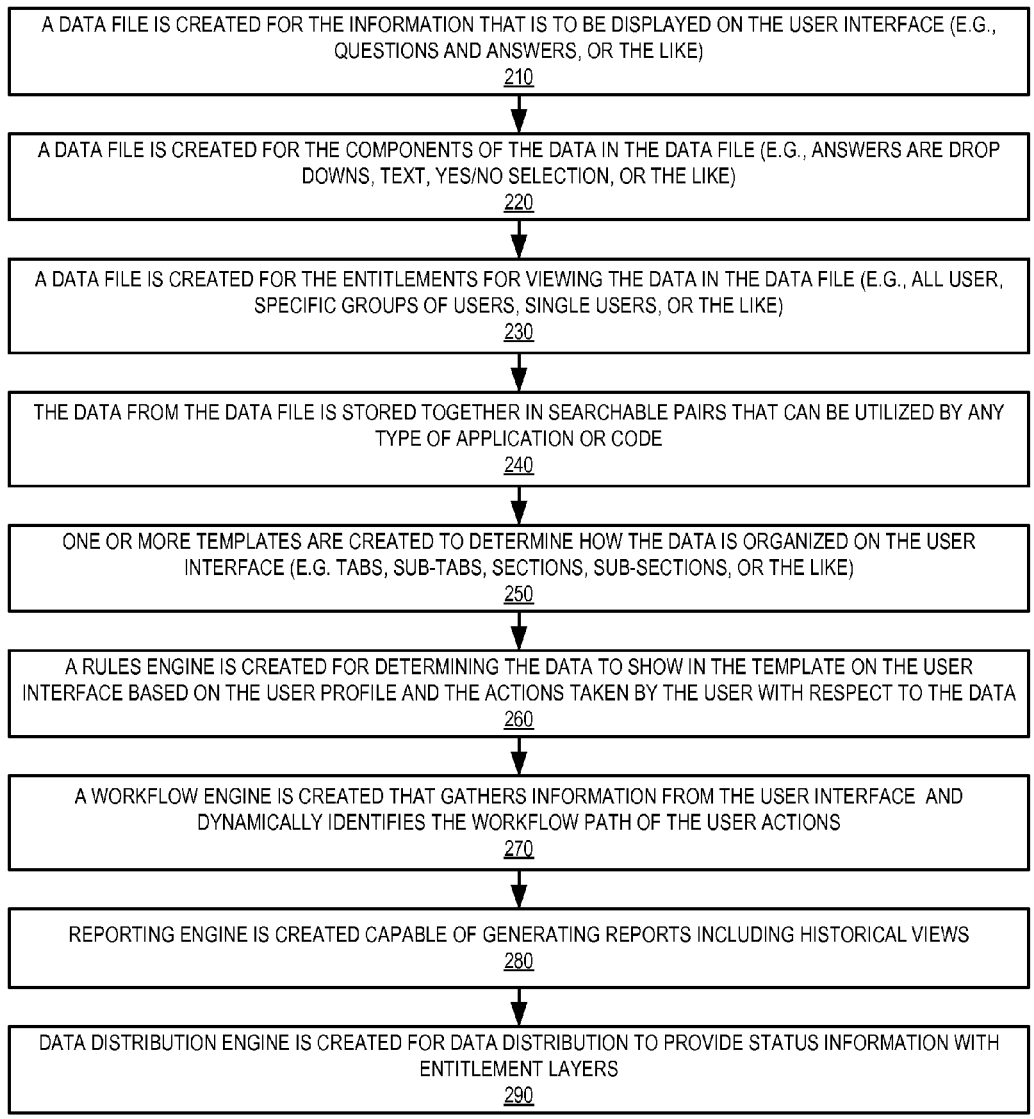
Figure 3:
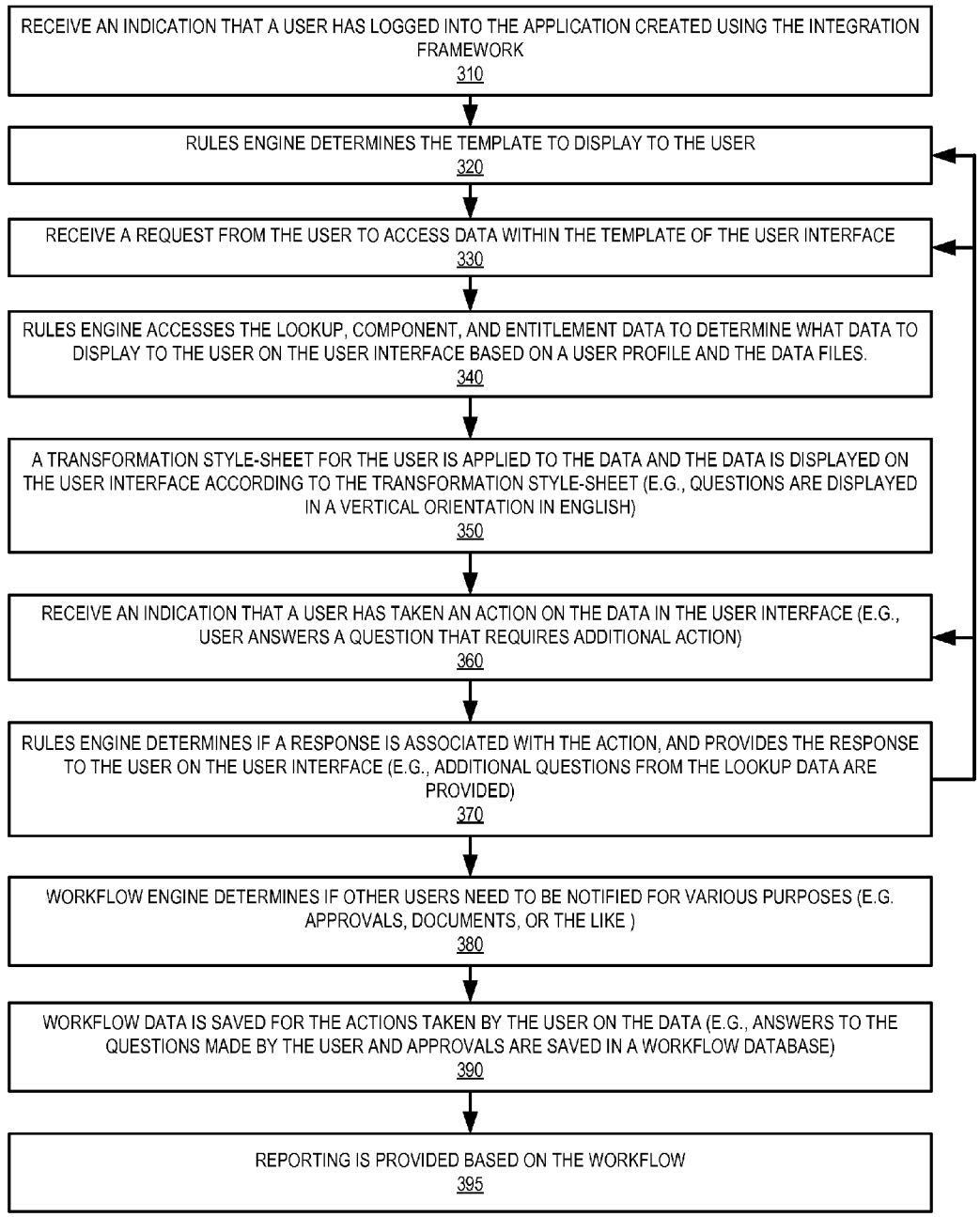
Figure 4:
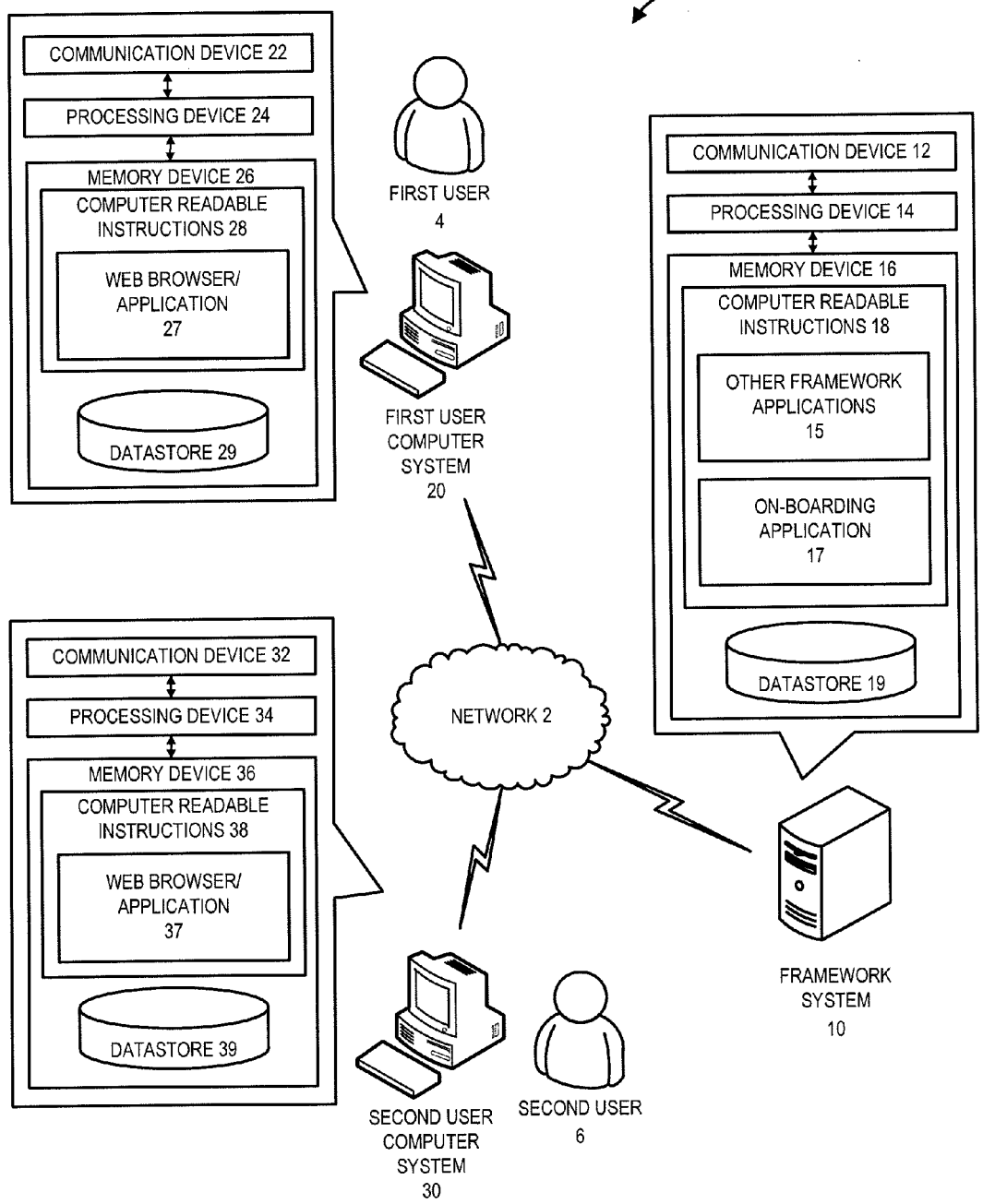
Figure 5:
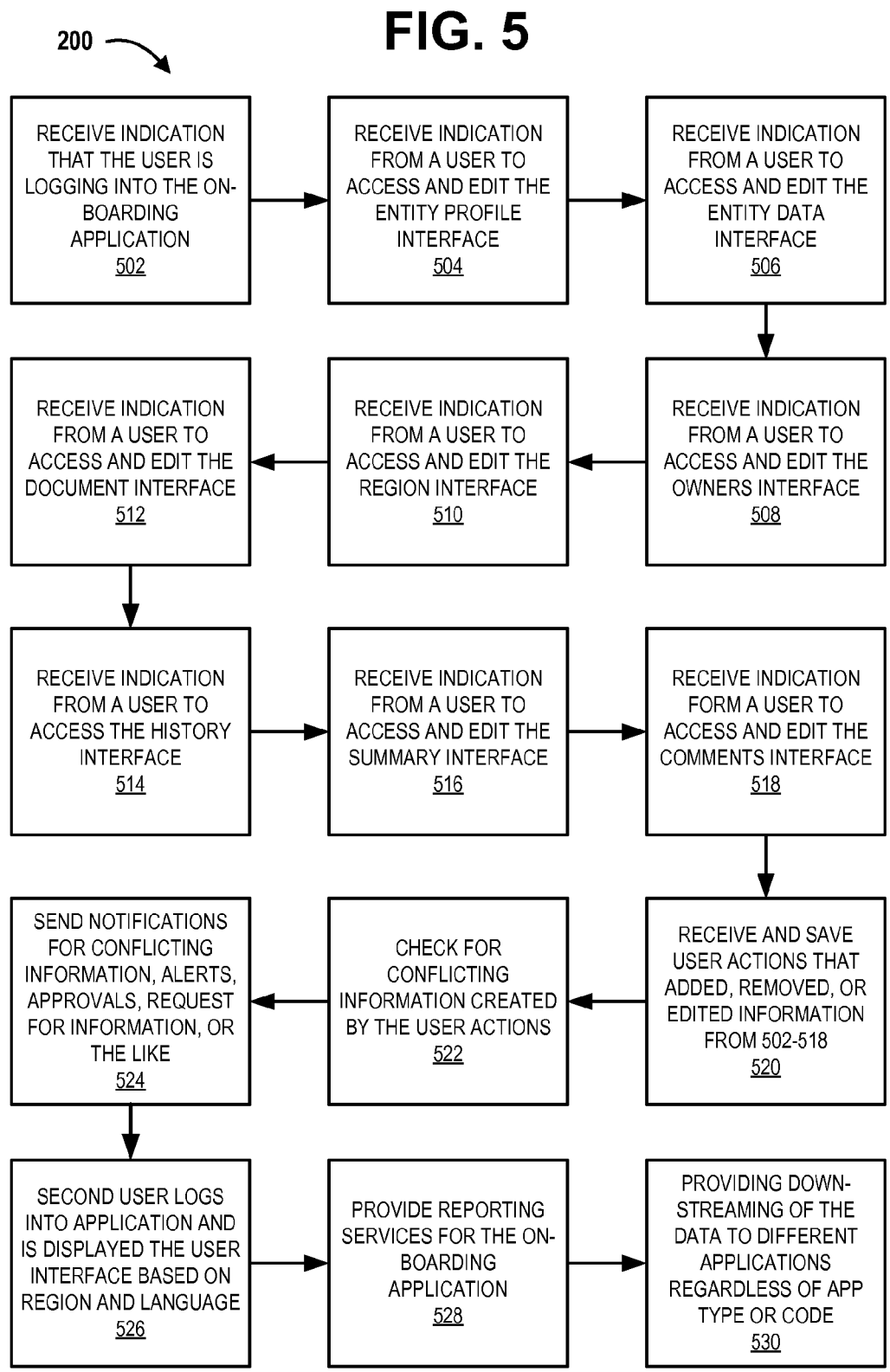
Figure 6:
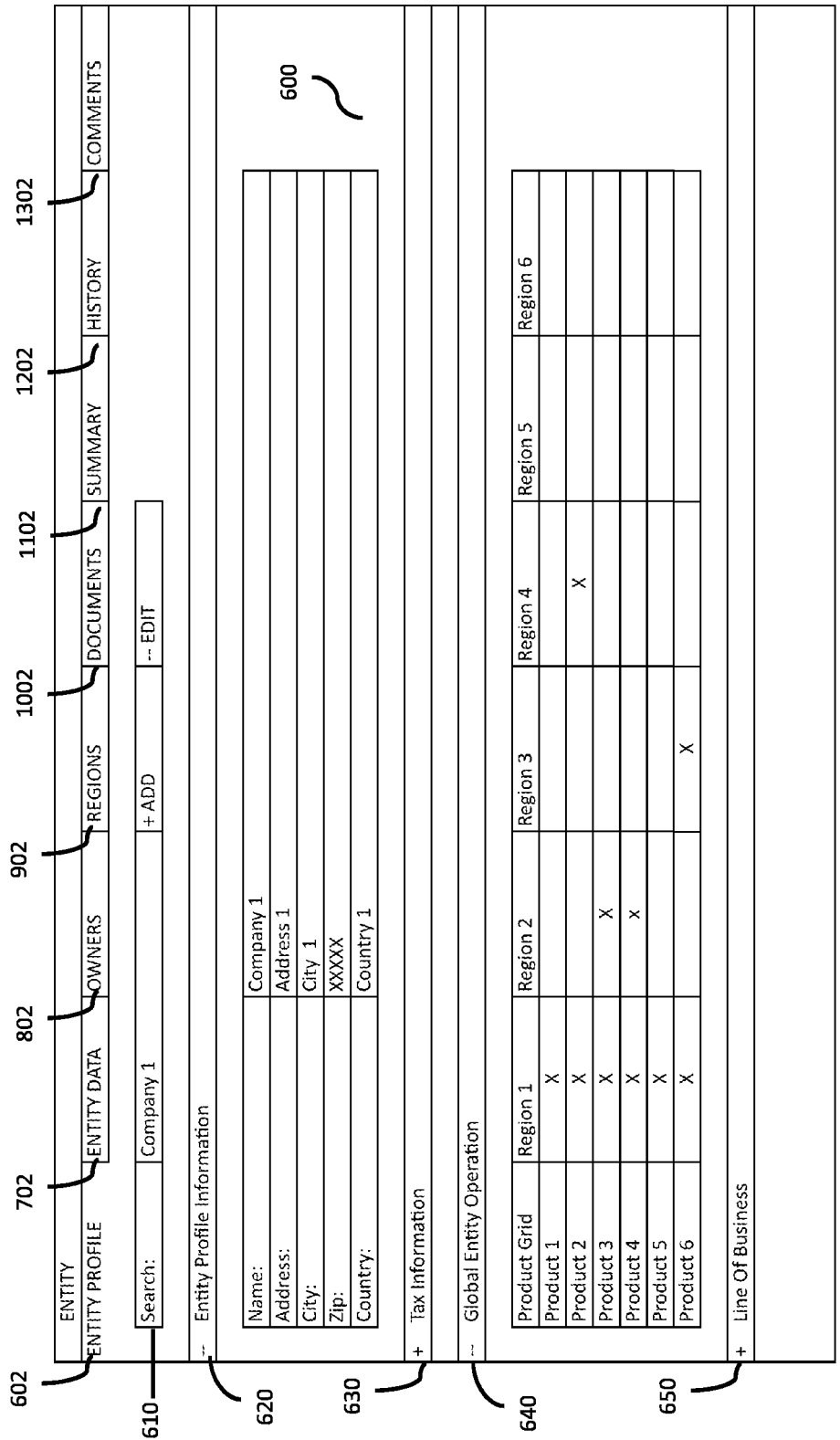
Figure 7:
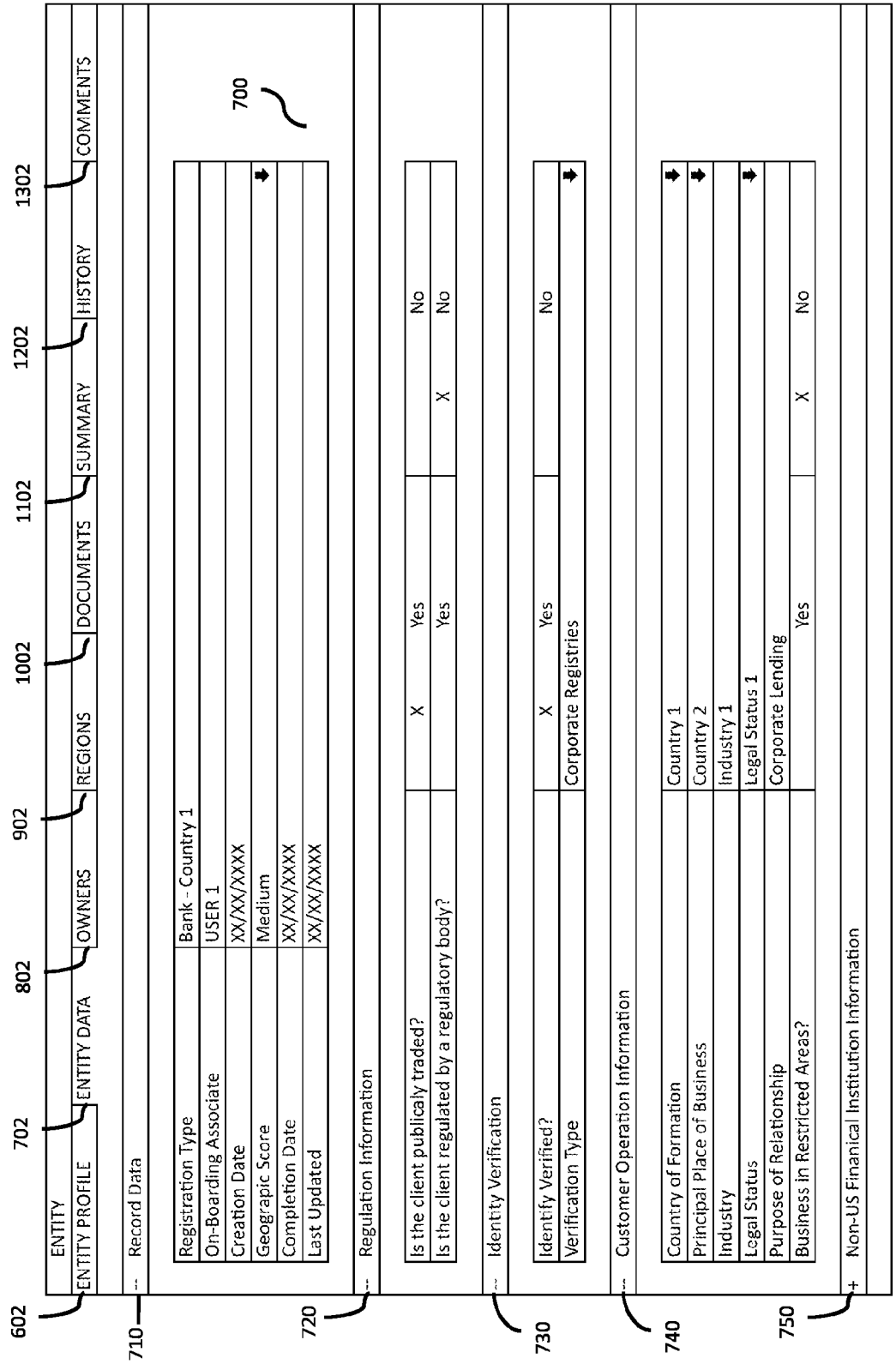
Figure 8:
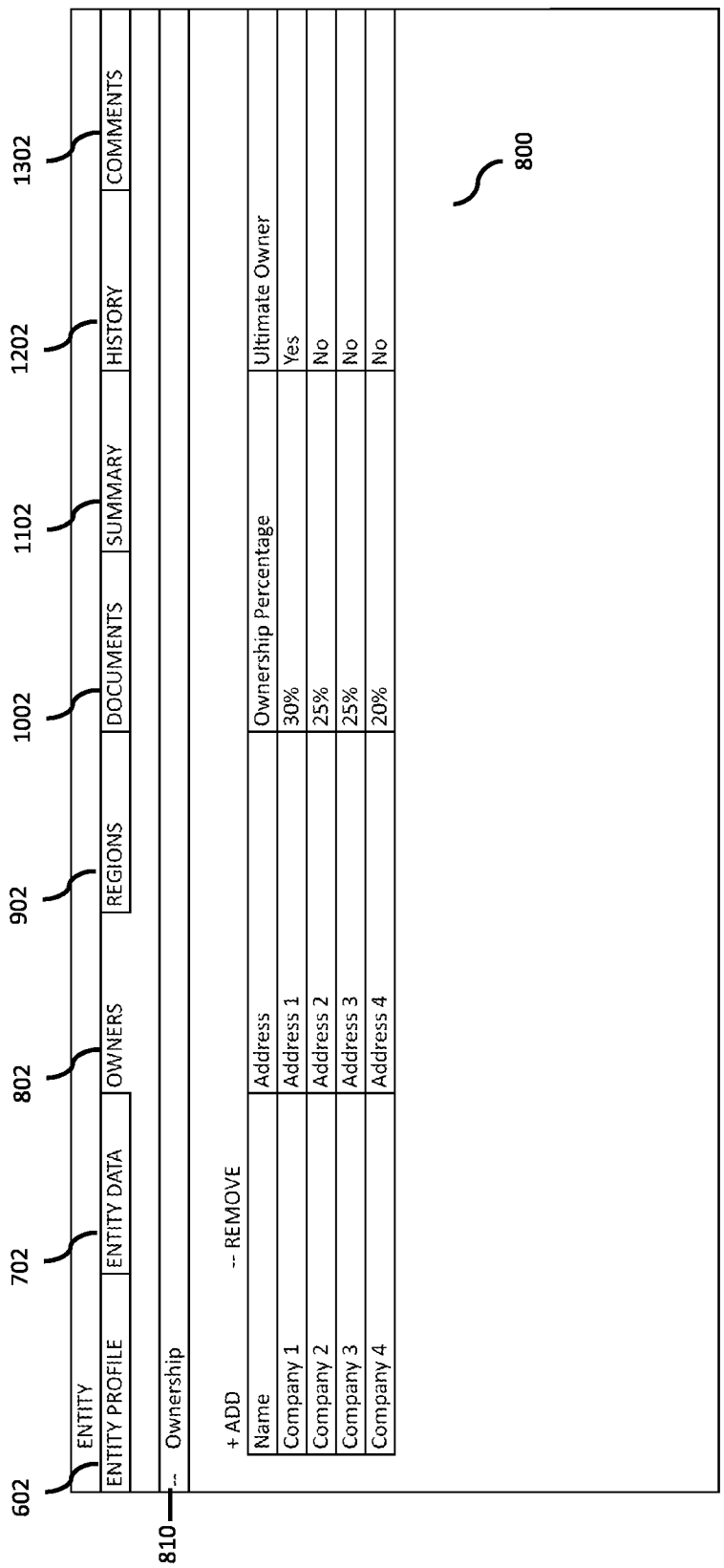
Figure 9:
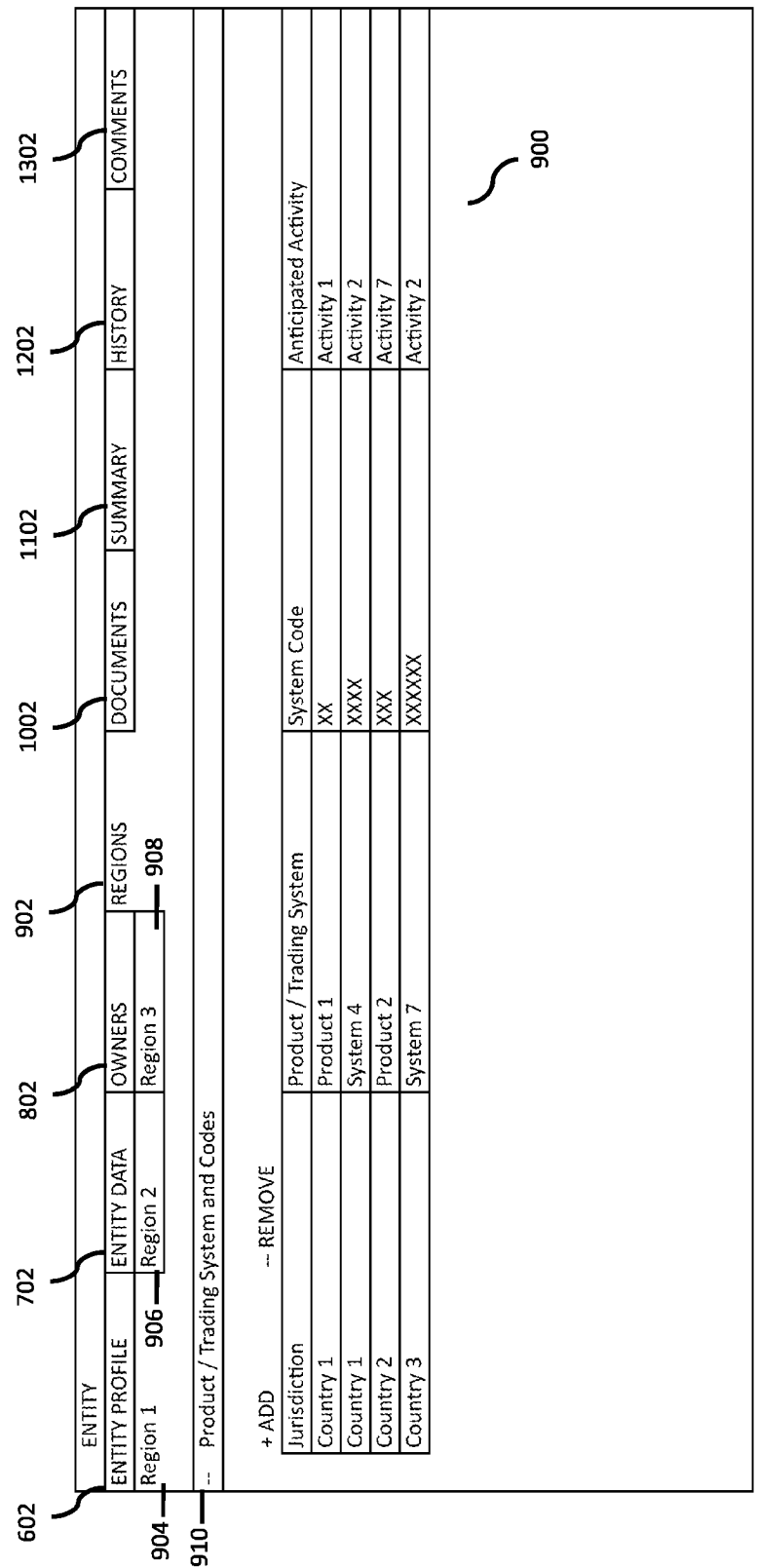
Figure 10:
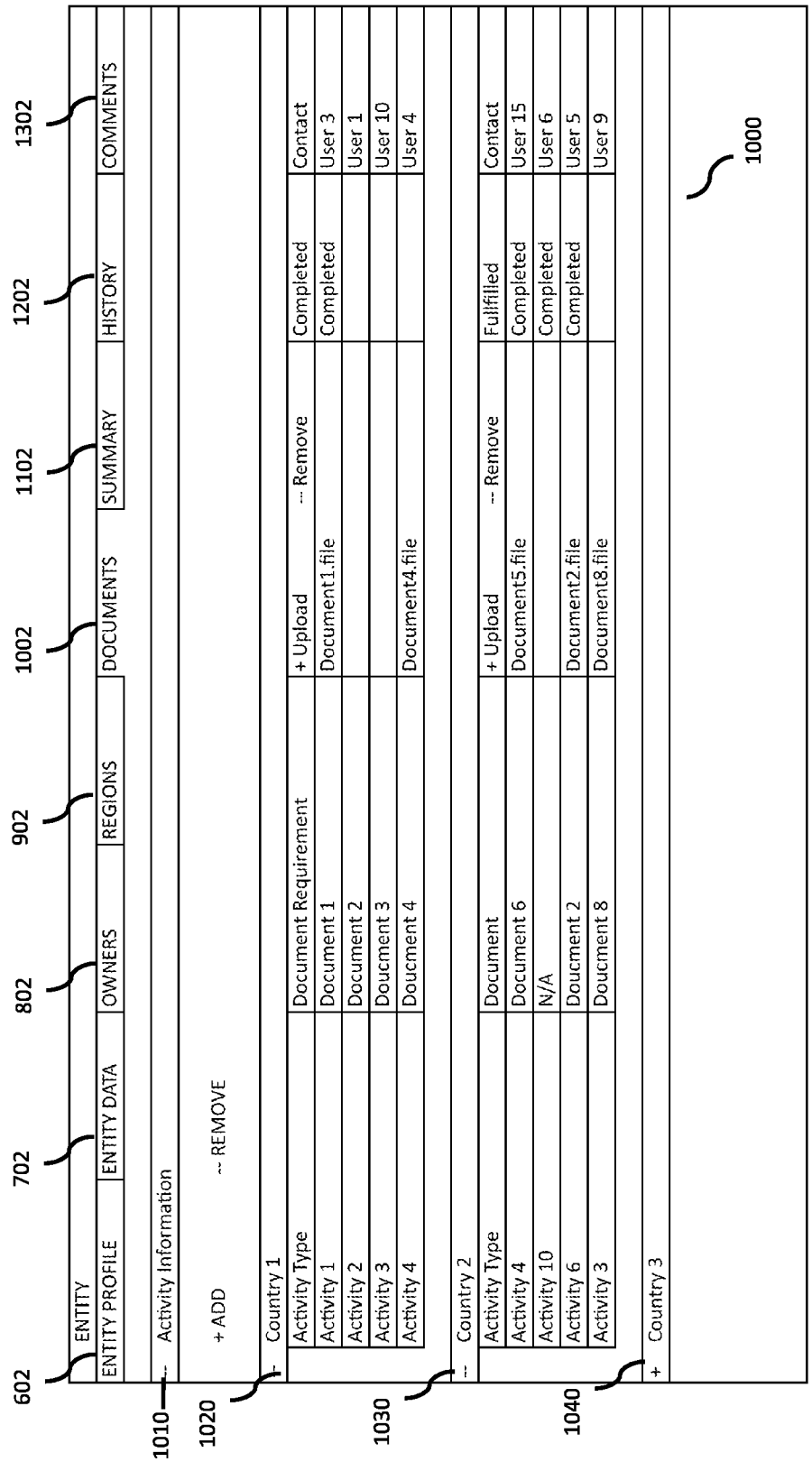
Figure 11:
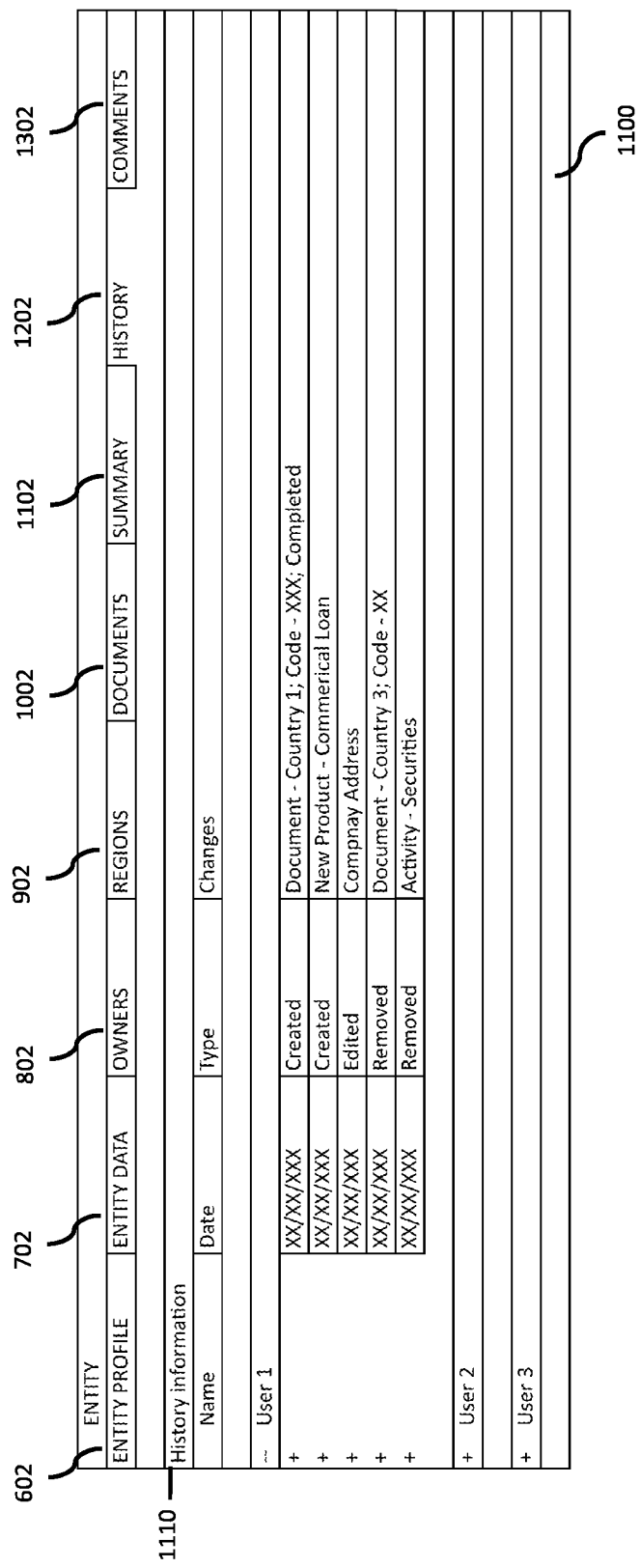

Having thus described embodiments of the invention in general terms, reference will now be made to the accompanying drawings, which are not necessarily drawn to scale, and wherein:

FIG. 1 illustrates an integration framework system, in accordance with one embodiment of the invention;

FIG. 2 illustrates an integration framework setup process, in accordance with an embodiment of the invention;

FIG. 3 illustrates an integration framework implementation process, in accordance with one embodiment of the invention;

FIG. 4 illustrates a integration framework environment, in accordance with one embodiment of the invention;

FIG. 5 illustrates an on-boarding process using the integration framework, in accordance with an embodiment of the invention;

FIG. 6 illustrates an on-boarding entity profile user interface, in accordance with an embodiment of the invention;

FIG. 7 illustrates an on an on-boarding entity data user interface, in accordance with an embodiment of the invention;

FIG. 8 illustrates an on an on-boarding owners user interface, in accordance with an embodiment of the invention;

FIG. 9 illustrates an on an on-boarding regional user interface, in accordance with an embodiment of the invention;

FIG. 10 illustrates an on an on-boarding documents user interface, in accordance with an embodiment of the invention; and FIG. 11 illustrates an on an on-boarding history user interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Generally, systems, computer program products, and methods are described herein for an application and system integration framework that provides interoperability and scalability for user interfaces and workflow processes within and/or between institutions. The integration framework system 100 may be used to create one or more applications to display data to users on user interfaces and allow the users to take actions on the data. The integration framework system 100 may be used to create any application for any type of data and display the data as desired by one or more users. The applications created by integration framework system 100 are interoperable, scalable, an updateable without having to recode the applications.

The integration framework system 100 includes the storage of data in one or more data files within a data storage database 110. The data files store the data that is eventually displayed to a user in a user interface 150. The data may be stored in a table, or other like spreadsheet, for example, an "xls" file. In some embodiments the data may be stored in one or more data files depending on the ultimate output desired in the user interface 150. As an example, the data may include a lookup data file 112, a component data file 114, and an entitlement data file 116. The lookup data file 112 may include any type of element data for display in a user interface 150. For example, in one embodiment of the invention the lookup data file 112 may comprise a list of questions and the one or more answer (e.g., pre-defined answers) associated with the list of questions. The component data file 114 may comprise component data types indicating the types of element data that is stored in the lookup data file 112. For example, with respect to the example of the questions and answers, the component data types may include an indication that the answers to the questions are in a dropdown list form, a check box form, a text answer form, or the like. The entitlement data file 116 may comprise a user type (e.g., entitlement type) indicating the one or more users that are allowed to access and/or take actions on the element data in the lookup data file 112. Returning to the example of the element data being questions and answers, the user type may include all users, manager users, analysis users, a combination of types of users, a list of users, individual users, or other like user types that limit the one or more users that may view and/or take actions on the one or more questions in the lookup data file 112.

In some embodiments the integration framework system 100 may also store the data from the data files as searchable linked data 132 in a linked data storage database 130. In some embodiments the linked data 132 may be name/value pairs, or other types linked data. The linked data 132 stored in the linked data storage database 130 allows searching, reading, and use of the linked data 132 by any type of application regardless of the type of application or code in which the application is created. In one embodiment, the data from the data files may be stored as an "xml" file. With respect to the example of the element data being questions and answers, the linked data may include a question identifier in the data files that links the questions and answers in the lookup data file 112, to the component data for the questions and answers in the component data file 114, and the user type for the questions and answers in the entitlement data file 116.

In addition to data files and linked data file, the integration framework system 100 may include one or more templates (e.g., first template 122, second template 124, Nth template 126) in a template database 120, which provide the structure for display of the element data in the user interfaces 150 within the integration framework application. The templates may include the tabs, sub-tabs, sections, sub-sections, entries within each, or the like, which provide an outline of how the data from the data files is presented in the user interfaces 150. In other embodiments of the invention the templates may include types of structure for the user interfaces 150 other than tabs, sections, and the like. In the example discussed herein with respect to the element data being questions and answers, the templates are used to provide the framework for the user interfaces 150 in which the questions and pre-defined answers are displayed to the user in the various tabs, sub-tabs, sections, sub-sections, or the like.

The integration framework system 100 may further include transformation style-sheets, which may be pre-determined or customizable for various users. The style-sheets may be applied to the data in the templates in order to indicate how to illustrate the element data from the data files in the user interfaces 150 as the user desires the element data to be illustrated. In further accord with the example of questions and answers discussed herein, a first style-sheet may indicate that the questions are to be illustrated one after another in a vertical orientation from top to bottom, and a second style-sheet may indicate that the questions are to be illustrated first in a left to right orientation before proceeding to the next vertical line.

The integration framework system 100 also includes a rules engine 140 that defines what element data is shown, how the element data is shown, when the element data is shown, and to whom the element data is shown in the user interfaces 150. With respect to the example of the data files comprising questions and answers, types of answers, and entitlements of users, the rules engine 140 may identify what questions to display to the user in the user interface 150 based on the user's profile, the user type from the entitlement data file, and how the user answers one or more of the questions in the user interface 150. For example, based on the type of user logged into the application, and the user type data from the data files, the rules engine 140 only displays the questions to the user that the user is approved to view or take actions on. Moreover, if a user takes an action by selecting "yes" as an answer to a question, the rules engine 140 provides a first set of questions to the user in the user interface 150, and if the user answers the same question with "no," the rules engine 140 provides a second set of questions to the user in the user interface 150. The rules engine 140 may be developed to provide the business logic, rules, and behavior for all the element data stored in the data files and eventually displayed in the user interfaces 150.

The integration framework system 100 in some embodiments may also include a workflow engine 160, which sends notifications to other users based on the actions a user takes on the user interface 150. The workflow engine 160 gathers information from the user interfaces 150 and dynamically identifies the workflow path of the element data and associated user actions. For example, if the user takes an action on the element data provided in the user interface 150, the workflow engine 160 determines if the user's action should be sent to another user (e.g., a manager user) to approve the action taken by the user or to take other actions. In some embodiments, the workflow engine 160 sends the notification of actions to the correct user. In the example discussed herein, after the first user answers one or more of the questions, a notification may be sent to a second user to approve or validate the answers to the questions provided by the first user. As explained in further detail later workflow engine 160 includes a provision to deal with multiple parallel requests and identifies any conflicting actions taken by users.

The integration framework system 100 may further include a workflow storage database 170 that stores the actions taken by the one or more users on the element data displayed to the users through the user interfaces 150. The workflow storage database 170 may include a record storage mechanism for object recovery with user draft provisions that allows for storage and retrieval of all the recorded actions and element data and the associated user that provided the actions. In the example discussed herein with respect to the questions and answers, the workflow storage database 170 may store the first user's answers to one or more of the questions and/or the second user's approval of the one or more questions answered by the first user, or the second user's answers to one or more other questions. As was the case with the linked data, the user actions may be stored as searchable data that may be read by any type of application regardless of the type of application or code of the application. For example, in one embodiment the workflow storage database 170 stores the user actions in key value pairs in an "xml" file to provide interoperability with the user interfaces 150.

In addition, a reporting engine 180 may also be included in the integration framework system 100. The reporting engine 180 is capable of generating various periodic reports. The reporting engine 180 may also be capable of allowing users to create customizable reports for the current data or historical data reflecting the data as of a specific dates provided by the users.

The integration framework system 100 may also include a data distribution engine 190 that provides on demand information (e.g., status information related to the element data and user actions) in real-time or near real-time. The data distribution engine 190 may include entitlement restrictions for the users that limits the use and access of the on-demand information.

The integration framework system 100 may also include other databases, applications, and systems that may interface with the data stored in the integration framework system 100. For example, in one embodiment the applications may include, but is not limited to, a translation application that may translate stored text, such as when answers to the questions are not provided as pre-defined answers.

The example discussed above with respect to the data comprising questions and answers is discussed in further detail with respect to FIGS. 2 and 3. FIG. 2 provides an application creation process 200 related to creating an application using the integration framework system 100, and FIG. 3 provides an application operation process 300 related to how the integration framework system 100 operates as a user is using the application created by the integration framework system 100.

As illustrated in FIG. 2, in one example a customer application for storing customer data may be created using the integration framework system 100. The customer application created may have a number of questions regarding customers, and associated potential answers for the questions.

As illustrated by block 210 in FIG. 2, a data file is created for the element data that is to be displayed on the user interface 150. As such, with respect to the example customer application, the questions and answers are first populated into a lookup data file 112. The lookup data may include a question identifier (e.g., Q1, Q2, Q3 . . . QN) or other like identifier, the associated question, and the associated one or more answers (e.g., pre-defined answers) for the question. The questions for the customer application may include for example; Q1: What is your geographic region; Q2: Are you a business or an individual; Q3: What is your business identification number; Q4: What is your individual identification number; QN: Other like questions. The lookup data file may also store answers for the questions, such as Q1: North, East, South, West; Q2 Business/Individual, or the like.

As illustrated in block 220 of in FIG. 2, a data file is created indicating the component data type of the element data located in the data file created in block 210. Therefore, in addition to populating a lookup data file 112, a component data file 114 may also be populated with a reference to the questions in the lookup data file 114, through the question identifier (e.g., Q1, Q2, Q3 . . . QN), or another identifier (e.g., 1-2-3, or the like). The component data file 114 includes an associated answer type for each of the question identifiers, which identifies types of answers for each of the questions in the lookup data file 112. For example, the component data file 114 may include the question identifier for Q1, Q2, Q3, Q4, . . . QN, and an associated answer type identifier, such as for example a dropdown identifier (e.g., DROPDOWN) for Q1 answers, a selection box identifier (e.g., SELECTION) of business/individual for Q2 answers, a five digit text box (e.g., TEXT5) for Q3 answers, and a seven digit text box (e.g., TEXT7) for Q4 answers, and other like answer types for the questions up to QN.

Block 230 of FIG. 2 illustrates that a data file is created for the entitlement data for viewing or taking actions on the element data in the data file created in block 210. Therefore, in addition to populating the lookup file 112 and the component file 114, an entitlement data file 116 is populated with a reference to the questions in the lookup data file 112, again through the question identifier (e.g., Q1, Q2, Q3 ... QN) or other like identifier. User types are then associated with the question identifier in the entitlement data file 116, indicating the users that have access to view or answer the questions through the use of a user type reference. For example, the entitlement data file may include an all user type identifier (e.g., ALL USERS) for answering Q1 and Q2, but a specific user type identifier (e.g., USER 1) or group of users identifier (e.g., USER GROUP1) to answer Q3 and Q4.

The types data entered into the data files described herein is only an example of the types of data that could be utilized by the integration framework system 100. It should be understood that any type of data may be included in the data files and work within the integration framework system 100 as is discussed and illustrated for the specific examples herein.

As illustrated in block 240 of FIG. 2, the data from the data files may be stored together as linked data in a linked data storage database 130. For example, the question identifiers (e.g., Q1, Q2, Q3 ... QN) in the lookup data file 112, the component data file 114, and the entitlement data file 116 links the data in each data file, within the linked data storage 130. As previously discussed the linked data 132 stored in the linked data storage database 130 allows searching and reading of the linked data 132 by any type of application regardless of the type of application or code in which the application is created. As previously discussed the data from the data files may be stored in an "xml" database.

Block 250 illustrates that one or more templates are created to determine how the data is organized on the user interface. The templates provide the underlining structure in which the questions and answers are eventually populated and displayed on the user interfaces 150. As previously discussed the templates may include the tabs, sub-tabs, sections, sub-sections, entries within each, or the like, that indicate how the element data from the data files is presented in the user interfaces 150. In one embodiment, the names for the tabs, sub-tabs, sections, or the like are stored in the data files, such that only the data files need to be updated when a name of a tab, sub-tab, section, or the like changes. In other embodiments the names of the tabs, sub-tabs, sections, or the like are created in the template itself.

As illustrated by block 260 in FIG. 2, once the one or more templates are formed the rules engine 140 is generated for decisioning how the templates are populated with the element data from the data files. The rules engine 140 provides what data is shown, how the data is shown, when the data is shown, and to whom the data is shown. In the example discussed herein the rules engine may recite that Q1 should be located in TAB 1, SECTION 1, while Q2, Q3, and Q4 should be located in TAB 2, SECTION 1, SUBSECTION 3. Moreover, the rules engine may recite that Q3 is only displayed in the user interface when the answer to Q2 is "Business" and Q4 is only displayed in the user interface when the answer to Q2 is "Individual."

The rules engine 140 is set up with general references back to the data files (or the linked data 132), such that the rules engine 140 need only be programmed once. If any changes are required for what the data is, the type of data, who can access the data, or the like, only the data files need to be updated and the rules engine 140 will still function to the display the data in the data files on the user interfaces 150 as originally defined in the rules engine 140. For example if access to Q3 and Q4 needs to be changed from "USER GROUP1" to "USER1" all that is required is to change the user type in the entitlement data file 116. In as second example, if a Q5 needs to be added based on the answer to Q2, the data files are simply updated with the new Q5 and the rules engine populates Q5 in the template in the user interface based on the answer to Q2.

As illustrated by block 270 in FIG. 2, a workflow engine 160 is created that gathers information from the user interfaces 150 and dynamically identifies the workflow path for the element data based on user actions with respect to the element data. For example, with respect to the questions and answers in a customer application, the workflow engine 140 may identify that a first user 4 is logged into the customer application and is entering information for a first customer. The first user 4 may have entered the answers for Q1 and Q2, but the based on the rules engine 140 the workflow engine 150 identifies that other users (e.g., a second user 6) are needed to answer either Q3 or Q4 (depending on the answer to Q2). The workflow engine 160 may send a notification to the other users (e.g., a second user 6) to answer Q3 or Q4 after identifying that the first user 4 has answered Q2. In some embodiments the workflow engine 160 may be programmed to interact with the rules engine 140 in order to determine the workflow path of the data; however, in other embodiments of the invention the workflow data is programmed into the rules engine 140 itself.

As illustrated by block 280 in FIG. 2, a reporting engine 180 is created that is capable of generating reports including historical views of the element data and user actions. For example, the data in the customer application may be provided to various users throughout the institution, a needed. In some embodiments the reporting engine 180 may be a plug-in application that interacts with the customer application created using the integration framework system 100.

Block 290 of FIG. 2 also illustrates that a data distribution engine 190 is created for data distribution of the element data and user actions in the application and to provide status information of the element data and user action. The data distribution engine 190 includes entitlements layers for users of applications within the integrated framework systems 100. In some embodiments the data distribution engine 190 may be a plug-in application that interacts with the customer application created using the integration framework system 100. In some embodiments of the invention the reporting engine 180 and the data distribution engine 190 may be included in a single engine.

FIG. 3 provides an application operation process 300 related to how the integration framework system 100 operates as a user is using an application created within the integration framework system 100.

In operation, as illustrated in block 310 of FIG. 3, the integration framework system 100 receives and indication that a user is logging into the customer application created within the integration framework system 100. The integrated framework system 100 determines the user, for example based on user profile data that may either be stored inside the application using the integrated framework system 100 or accessed as a plug-in to the integrated framework system 100 (e.g., user directory within the institution).

As illustrated by block 320, in response to the user logging into the application, the rules engine 140 determines the template to provide to the user based, in part, on the user profile and how the user logged into the application, for example a user may log into the full application and the full application template is provided (e.g., TEMPLATE 1), or the user may log into a light version of the application and a light template is provided (e.g., TEMPLATE 2). Thereafter, the application then displays the template to the user in the user interface 150 accordingly.

Block 330 illustrates that the application receives an indication that a user would like to take an action within the application. For example, the user may take an action by indicating the user would like to answer questions for a particular customer.

As illustrated by block 340, at this point the rules engine 140 accesses the lookup data file 112, the answer type for the associated question answers from the component data file 114, and the user type from the entitlement data file 116 (or alternatively access this information collectively in the linked data file 132) in order to determine what questions should be displayed to the user in response to the user action.

As illustrated in block 350 the rules engine 140 within the integration framework system 100 applies a general style-sheet or a customized style-sheet (e.g., style-sheet that displays the questions from top to bottom) to the questions and answers, based on the user preferences, and displays the questions and answers in the associated answer type (e.g., a dropdown) to the user in the user interface 150 using the template according to the style-sheet.

As illustrated by block 360 the application in the integration framework system 100 receives an indication that the user would like to take an action with respect to the data in the user interface 150, such as answering a question about the customer in the user interface 150.

Block 370 illustrates that once the user takes an action on a question (e.g., selecting a Business or Individual for Q2), the rules engine 140 determines any additional questions or other responses that should be provided to the user in the user interface 150 based on the lookup data, the entitlement user type for additional questions, and the user profile of the user taking actions on the questions. If the rules engine 140 determines that additional questions should be provided in the user interface 150, the style-sheet is applied to the additional questions, if any, and the additional questions are displayed to the user in the user interface 150 based on the template and the style-sheet.

The user may repeat blocks 320 through 370 until the user has taken all of the actions that the user would like to take within the application. For example, until the user has answered all of the questions within a section of the template or within the various section of the template for one or more customers.

As illustrated by block 380, the workflow engine 160 determines if other users (e.g., second users 6) should be notified of any actions taken by the user (e.g., first user 4) or notified of actions that that the other users need to take. For example, the questions answered by a first user 4 may need to be confirmed, or otherwise approved, by a second user 6 before the questions are finalized for a particular customer within the customer application. The workflow engine 160 sends notifications or links to the second user 4 whenever the additional actions are required within the user interface 150 for the element data related to one or more the customers. The workflow engine 160 facilitates completing the tasks for the processes that are incorporated into an application created using the integration framework system 10.

As illustrated by block 390 of FIG. 3, the application may save any actions the various users take with respect to element data for the one or more of the customers in a workflow storage database 170. For example, if the user answers all of the questions for a particular customer, the changes for that customer are stored in the workflow storage databases 170. Also, if approval has been made with respect to user actions, approval data may also be stored within the workflow storage database 170. As previously discussed the workflow storage database 170 may store data in a format that is readable by any application with any type of code to facilitate interoperability between applications and institutions.

Block 395 of FIG. 3 illustrates that reporting of the element data and user actions are provided based on the workflow data stored in the workflow data storage database 170.

The integration framework system 100 described herein allows any user to see the same information in customized interfaces based on the entitlement of the user, how the user wants to the see the information, and the rules related to what is shown based on the selections made by the user. For example, a user taking an action on a question located in a specific region may be required to take additional actions to answer a number of additional questions; however, the same user (or a different user) located in another region may not be required to take any additional actions. Moreover, in the example application, since the questions and associated answers are known, the questions and answers may be translated within the data files, such that the questions and answers may be provided to the users in any language. Therefore, the integration framework system 100 creates customizable views for individual users all over the world that may have different personal requirements for viewing data, as well as different regulatory requirements based on the location of the user.

The present invention allows for interoperability and scalability for workflow processes within and/or between institutions because if any of the data needs to be changed, only the original data files are updated and the rest of the integration framework system 100 continues to operate without needed additional changes to the code of the applications within the integration framework system 100. For example, if questions answers change, the answers in the element data file are updated, or if user access to individual questions changes, the entitlement type is updated, and the application will continue to operate without having to reprogram the template or rules engine 140.

These embodiments only discuss some of the features of the integrated framework, and as such, these and other embodiments of the invention are discussed in further detail throughout this specification below.

FIG. 4 illustrates an integration framework system environment 1, in accordance with one embodiment of the invention. As illustrated in FIG. 4, one or more integration framework systems 10 are operatively coupled, via a network 2, to first user computer systems 20, and second user computer systems 30. In this way one or more first users 4 and second users 6 may utilize the first user computer systems 20 and second user computer systems 30 to access the framework systems 10 to utilize the framework applications 15 (e.g., applications created using the integration framework systems 100), such as the on-boarding framework application 17 described in further detail below. The integration framework system 10 is illustrated in FIG. 4 as a single system; however, the integration framework system 10, may be made up of one or more systems, databases, engines, applications, or the like, as described for example with respect to the integration framework system 100 illustrated in FIG. 1.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

In some embodiments of the invention the first user 4 and the second user 6 (e.g., employees, agents, contractors, legal representatives, or the like) affiliated with an institution have access to the framework system 10 for either creating the framework applications 15 or utilizing the framework application 15 after the applications are developed. In the embodiment of the invention described below the first user 4 has first access rights to the data within the on-boarding application 17 and the second user 6 has second access rights to the data within the on-boarding application 17. For example, the first user 4 may be tasked with on-boarding an entity in order to allow the first user's institution to comply with internal and external regulation before doing business (e.g., entering onto financial transactions) with the entity. The second user 6, may be tasked with additional on-boarding of the entity, or otherwise, with approving the on-boarding performed by the first user 4. One or more additional users may also on-board or complete other tasks before the entity is approved for entering transactions with the institution performing the on-boarding the entity.

As illustrated in FIG. 4, the framework system 10 generally comprise a communication device 12, a processing device 14, and a memory device 16. The processing device 14 is operatively coupled to the communication device 12 and the memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 uses the communication device 12 to communicate with the network 2 and other devices on the network 2, such as, but not limited to, the first user computer systems 20 and the second user computer systems 30. As such, the communication device 12 generally comprises a modem, server, or other device for communicating with other devices on the network 2.

As further illustrated in FIG. 4, the financial institution systems 10 comprise computer-readable instructions 18 stored in the memory device 16, which in one embodiment includes the computer-readable instructions 18 of framework applications 15 (e.g., mobile applications, cloud applications, system applications, database applications, or other like applications), such as an on-boarding framework application 17. The computer-readable instructions 18 may further comprise the rules engine 140, workflow engine 160, reporting engine 180, and data distribution engine 190. In some embodiments, the memory device 16 includes a datastore 19 for storing data related to the financial institution systems 10, including, but not limited to, data created and/or used by the framework applications 15. The data store 19 may further include the data storage database 110 with the data files, the template database 120, the linked data storage database 130, and/or the workflow storage databases. In other embodiments of the invention the applications, engines, and databases may be completely or partially located on other computer systems, such as first user computer systems 20 or second user computer system 30, or other systems.

The on-boarding application 17 is a tool that consolidates and ensures consistent implementation of business compliance with regulatory policy (e.g., anti-money laundering ("AML") policy) across a global business that is required to comply with regulations of international, regional, country specific, local jurisdictions, or the like. The on-boarding application 17 facilitates the work flow, approvals, documents, reporting, and other information using dynamic rules that dictate the on-boarding elements based on customer type, booking entity, location of the authorized approval, special products, data collected, and the like, which are used to dynamically evaluate the client's on-boarding potential regulatory issues, and the actions used to mitigate potential regulatory issues with the entity being on-boarded.

As illustrated in FIG. 4, the first user 4 may access the on-boarding application 17 through a first user computer system 20. The first user computer system 20 may be a desktop, laptop, tablet, mobile device (e.g., smartphone device, PDA, phone, or other like mobile device), or any other type of computer that generally comprises a communication device 22, a processing device 24, and a memory device 26. The processing device 24 is operatively coupled to the communication device 22, and the memory device 26. The processing device 24 uses the communication device 22 to communicate with the network 2 and other devices on the network 2, such as, but not limited to, the framework systems 10, the second computer systems 30, and/or other systems. As such, the communication device 22 generally comprises a modem, server, or other device for communicating with other devices on the network 2 and/or a keypad, keyboard, touch-screen, touchpad, microphone, mouse, joystick, other pointer device, button, soft key, and/or other input device(s) for communicating with the first user 4.

As illustrated in FIG. 4, the first user computer system 20 may have computer-readable instructions 28 stored in the memory device 26, which in one embodiment includes the computer-readable instructions 28 of a web browser or application 27 that allows the first user 4 to access the on-boarding application 17, or the other framework applications 15. In some embodiments, the memory device 26 includes a datastore 29 for storing data related to the first user computer system 20, including but not limited to data created and/or used by the web browser or application 27.

As illustrated in FIG. 4, the second user computer system 30 generally comprises a communication device 32, a processing device 34, and a memory device 36. The processing device 34 is operatively coupled to the communication device 32 and the memory device 36. The processing device 34 uses the communication device 32 to communicate with the network 2 and other devices on the network 2, such as, but not limited to, the first user computer system 20, the framework systems 10, and/or other systems. As such, the communication device 32 generally comprises a modem, server, or other device for communicating with other devices on the network 2 and/or a keypad, keyboard, touch-screen, touchpad, microphone, mouse, joystick, other pointer device, button, soft key, and/or other input device(s) for communicating with the second user 6.

As further illustrated in FIG. 4, the second user computer system 30 comprise computer-readable instructions 38 stored in the memory device 36, which in one embodiment includes the computer-readable instructions 38 of a web browser or application 37 that allows a second user 6 to access the on-boarding application 17, or other framework application 15. In some embodiments, the memory device 36 includes a datastore 39 for storing data related to the employee computer systems 30, including but not limited to data created and/or used by the web browser or application 37.

As previously indicated, in some embodiments of the invention the on-boarding application 17, or the other framework applications 15, may be located completely or partially on the framework systems 10, first user computer system 20, second user computer system 30, or other systems not specifically illustrated or described with respect to FIG. 4.

FIG. 5 illustrates an on-boarding application process 500 using the integration framework system 100, in accordance with an embodiment of the invention. As previously discussed the on-boarding application 17 is a tool that consolidates and ensures consistent implementation of business compliance with regulations (e.g., anti-money laundering ("AML") policy) across a global business that is required to comply with regulations of international, regional, country specific, or local jurisdictions, or the like. The on-boarding application 17 facilitates the work flow, approvals, documents, reporting, and other information using dynamic rules that dictate the on-boarding elements based on customer type, booking entity, location of the authorized approval, special products, data collected, and the like, which are used to dynamically evaluate the client's on-boarding potential regulatory issues, and the actions used to mitigate the potential regulatory issues with the entity being on-boarded, as is explained in further detail below.

An institution may utilize the on-boarding application 17 to consolidate all of the institution's regulatory requirements in a single data and document repository that allows global leveraging of on-boarding entities and reduction of redundant on-boarding systems. The on-boarding application provides the ability to manage the approval process for making sure client entities and prospective client entities comply with all of the regulatory requirements on international, regional, and a local level. The on-boarding application 17 further allows for the set-up and maintenance of the products involved in the transactions between the institution and the entities being on-boarded, as well as the reporting and monitoring of the products and transactions made with entities around the world as the product, transactions, and the business of the entities change.

As illustrated by block 502 the first user 4 logs into the on-boarding application 17. As previous described when a user logs into an application created using the integration framework system 100, the rules engine 140 determines the template, and displays the template in the user interface 150.

As illustrated in block 504 of FIG. 5, the first user 4 may select the entity profile tab 602 in order to access an entity profile interface 600 to create an entity profile for a new entity, or otherwise edit an entity profile that has already been at least partially on-boarded for one or more products, as illustrated in FIG. 6. By selecting the entity profile tab 602 the entity profile interface 600 is displayed to the first user 4. The first user 4 may search for a specific entity that already exists to view the on-boarded entity information, search for a specific entity to edit the profile, or add a new entity to the on-boarding application 17. For example, the first user 4 may take these actions by utilizing the company search section in the user interface 610. The entity profile interface 600 illustrates a number of sections within the entity profile tab 602 that may be expanded or hidden to allow the first user 4 to view, add, update, or remove (e.g., edit) information about an entity. As an example, the first user 4 may update general information for the entity in an entity information section 620, such as the entity name and address. The first user 4 may also provide tax information for the entity to help provide information for regulatory compliance. The entity profile interface 600 may also include a global entity product grid section 640 that indicates the products and regions for which and in which the first user 4 wants want to on-board the entity. For example, the first user 4 may want to on-board the entity for entering into product 3 transactions with the entity in region 2 and product 6 transactions with the entity in region 3. The product grid may illustrate that the entity is accepted for transactions, is in process for acceptance, is rejected, or other like indicator that identifies the status of the on-boarding for products and regions for which the entity is being on-boarded. In some embodiments the on-boarding indicators in the product grid may have links that allow the first user 4 to view, add, update, or remove (e.g., edit) information related to the on-boarding process for the specific products and regions. In other embodiments of the invention, the entity profile interface 600 may also have a line of business section 650 that allows the first user 4 to view, add, update, or remove (e.g., edit) information related to one or more lines of businesses and contact information for the lines of business that are involved in on-boarding the entity for one or more products in one or more regions.

As illustrated in block 506 of FIG. 5, the first user 4 may select the entity data tab 702 in order to access an entity data interface 700 allowing the first user 4 to view, add, update, or remove (e.g., edit) entity data related to the entity on-boarded or being on-boarded, as illustrated in FIG. 7. As illustrated in the entity data interface 700 in FIG. 7, the first user 4, for example, may enter or update the record data section 710 for information related to the entity and the user that is on-boarding the entity. For example the record data section, includes information related to the registration type, the associate on-boarding the entity, the creation date of the on-boarding record, a geographic score indicating potential issues with the entity based on the geography in which the entity operates (e.g., operates in North America and South America), the completion data of the on-boarding, and/or the date the entity was last updated. The entity data interface 700 also includes a regulation information section 720, including information regarding if the company is public or private, is the entity regulated by a governing body, or other like regulation information. The entity data interface 700 may also comprise an identity verification section 730 that indicates if the identity of the entity has been verified and how the entity has been verified. A customer operation information section 740 may also be included in the entity data interface 700. The customer operation information section 740 may include the country of formation, the principle place of business, industry, legal status, purpose of the relationship with the entity, business practices in restriction areas, or other like operation information. Furthermore, in one embodiment the customer operation information section 740 may also include a foreign operation information section 750 related to the operations of the entity in foreign countries.

The regulation information section 720, and other sections within the user interfaces 150 provide examples of questions that are provided by the rules engine 150 based on the first users 4 answers to other questions. For example, as illustrated, if the first user 4 answers "yes" to the question "Is the client publically traded?" the follow-up question provided by the rules engine 150 is "Is the client regulated by a regulatory body?" Alternatively, if the first user 4 answers "no" to the question "Is the client publically traded?" then alternative questions may be provided related any public information that may available for the private company.

As illustrated in block 508 of FIG. 5, the first user 4 may select the owners tab 802 in order to access the owners interface 800 allowing the first user 4 to view, add, update, or remove (e.g., edit) owners data related to the entity on-boarded or being on-boarded, as illustrated in FIG. 8. As illustrated in the owners interface 800 the first user 4 may add or remove information related to the one or more companies or individuals that have ownership stakes in the entity on-boarded or being on-boarded, such as name, address, ownership percentage, ultimate owner (e.g., indicating if the company listed is the true owner), or other like ownership information.

As illustrated in block 510 of FIG. 5, the first user 4 may select the region tab 902 in order to access the region interface 900 allowing the first user 4 to view, add, update, or remove (e.g., edit) regional data related to the entity on-boarded or being on-boarded, as illustrated in FIG. 9. The region interface 900 may include sub-tabs (e.g. Region 1 904, Region 2 906, and Region 3 908) for various regions in which the entity is operates. Within, for example, the Region 1 tab 804 the first user 4 may view, add, update, or remove (e.g., edit) information related to the operations of entity in specific countries within the region. For example, as illustrated by the region interface 900 the first user 4 may populate the interface with information relating the countries in the region, products or trading system being used by the entity in the region, the system codes for the trading systems, and the anticipated activity of the entity for the products within the countries in the regions.

As illustrated in block 512 of FIG. 5, the first user 4 may select the documents tab 1002 in order to access the documents interface 1000 allowing the first user 4 to view, add, update, or remove (e.g., edit) documents and related information to the entity on-boarded or being on-boarded, as illustrated in FIG. 10. The documents interface 1000 illustrates an activity section 1010 that includes country sections 1020, 1030 in which the activities of the entity are listed with respect to each country in which the entity participates in various activities. As illustrated with respect to the country 1 section 1020, the section may include information about the one or more activities taken by the entity, the documents associated with the activity, an unloadable document, an indication of fulfillment of the document requirements, and contact information for the activity and or the associated document. In some embodiments, the document section provides information about the document that is needed for the particular activity within the particular country.

As illustrated in block 514 of FIG. 5, the first user 4 may select the history tab 1102 in order to access the history interface 1100 allowing the first user 4 to view history data related to the actions taken by various users within the history interface 1100 for the entity on-boarded or being on-boarded, as illustrated in FIG. 11. The history interface 1100 may include a history information section 1110, which includes the name, data, type, and changes made by users within the user interfaces 150 (e.g., the other tabs in the on-boarding application). The data related to a specific user may be expanded and hidden to view information related to the actions that a user has taken within the user interface 150.

As illustrated in block 516 of FIG. 5, the first user 4 may also select the summary tab 1202 in order to access a summary interface (not illustrated) that illustrates a summary of the other tabs created by the viewer to provide an overview of the entity on-boarded or being on-boarded.

As illustrated in block 518 of FIG. 5, the first user 4 may select the comments tab 1302 in order to access a comments interface (not illustrated) allowing the first user 4 to view, add, update, or remove (e.g., edit) comments related to the entity on-boarded or being on-boarded.

Block 520 illustrates that the on-boarding application 17 in the integration framework system 100 receives indications that the first user 4 has added, updated, or removed information (e.g., edited) as described with respect to blocks 502 through 518 to on-board an entity for participating in transactions with the institution that is on-boarding the entity. Since the on-boarding application 17 is created through the integration framework system 100 the on-boarding application 17 has the benefits previously discussed herein. Therefore, in some embodiments of the invention one or more of the questions displayed within the user interfaces discussed with respect to blocks 502 through 518 may be displayed in a form in which the first user 4 can view but not take actions on the information. In other embodiments of the invention, one or more of the questions may not even be displayed to the first user 4 if the first user does not meet the entitlement data type in the entitlement data file 116. In some embodiments of the invention entire entities may be hidden from particular users, for example from users that do not have clearance to review the on-boarding information for the particular entities.

As illustrated by block 522 of FIG. 5, in one embodiments of the invention an entity may be on-boarded by one or more users in one or more regions. As such conflicting information may be included in the on-boarding application 17 between different users that are currently on-boarding or have on-boarded the entity in the past. This conflict information may be identified as previously discussed with respect to the workflow engine 160. Therefore, as the first user 4 is viewing, adding, updating or removing (e.g., editing) data in the user interfaces for an entity, the workflow engine 160 is searching for conflicting information that other users have on-boarded for the same entity, and as such the on-boarding application 17 may notify the first user 4 that conflicting information may exist within the on-boarding application 17 for one or more actions taken by the first user 4 and other users within the on-boarding application 17. For example, the entity's tax information entered by the first user 4 in the entry profile interface 600 is different from another user's entry of tax information for the same entity. The notification provided to the first user 4 may be a pop-up window, message, e-mail, or other like notification that indicates to the first user 4 that there is conflicting information related to the on-boarded entity.

As illustrated by block 524, a notification for user actions may be sent to other users within the on-boarding application 17. For example, if a first user 4 uploads a document for a particular type of activity of a company and indicates that the document requirement is fulfilled, then before the document is approved for being listed as fulfilled a notification may be sent to a second user 6 that has approval access for the actions of the first user 4. The second user 6 logs into the on-boarding application 17 and approves that the documents is proper, or otherwise approves that the first user 4 has completed the document requirements. Other notifications may also be sent to users, such as but not limited to requests for information to be sent to particular users or lines of business, notifications to users to complete particular sections within the user interfaces 150, or other like notifications.

Block 526 illustrates, that after notifications are sent a second user 6 may log into the on-boarding application 17 to add, update, or remove (i.e., edit) or view information the user interfaces 150. In other embodiments, the second user 17 may not receive a notification, and is simply logging into the user interface 150 to on-board an entity or continue on-boarding an entity. As previously discussed with respect to the integration framework system 100 in general, the user interface 150 for the on-boarding application 17 displayed to the second user 6 is displayed based on the second user's entitlements, the user's preferred style-sheet, the region in which the user is located, and other user profile information, such as the language in which the user wishes to view the user interface 150 for the on-boarding application 17.

Block 528 of FIG. 5, further illustrates that reporting and data distribution services for the on-boarding application 17 may be applied to the data in on-boarding application 17 to provide reports regarding the on-boarding status of specific entities, status of entity products, entity documents, or the like. The reporting and data distribution services also may utilize entitlement and privacy features that have been previously discussed throughout this specification in order to control the information that can be disseminated through the on-boarding application 17. The reporting service through the reporting engine 180 may be utilized to report entity information, product information, or transactions information to regulatory bodies. For example, sending regulatory reports to the regulatory agencies in different regions and/or countries. The data distribution services may interact with various applications and systems inside and outside of the institution to monitor the entities that have been on-boarded or are in the process of being on-boarded when entity, product, or transaction information changes. For example, the on-boarding application 17 may interact with regulatory bodies to notify the users when entities have been flagged for regulatory issues. The on-boarding application may also be used to restrict or close a relationship with an entity by changing the products or transactions for which the entity has been on-boarded.

As illustrated by block 530 of FIG. 5 the on-boarding application 17, as is the case with other application within the integration framework system 100, may interact with other applications inside and outside of the institution that allow the data related and used within the on-boarding application 17 to be sent downstream for use by other applications. As an example, the data (e.g., entitlement data, user action data, or the like) related to the on-boarded entities may be stored as "xlm" files, and thus, be provided to other applications and displayed in other formats, such as "html."

In addition to the on-boarding application 17 functions already discussed herein, the on-boarding application 17 is able to allowing drafting and saving of the on-boarding for various entities over time as the information for the entities is determined, identified, and changes.

The on-boarding application is described herein with respect to a first user 4 and a second user 6, but it should be understood that the actions taken by the first user 4 may also be taken by the second user 6, and vice versa, as well as by one or more other users. As such, the actions described herein may be taken by any user that is has been given the authority to take actions through the entitlement data file 116 or through other authorization.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for on-boarding entities to comply with compliance regulations utilizing an integration framework, the system comprising:

one or more memory devices having computer readable program code store thereon; and one or more processing devices operatively coupled to the one or more memory devices, wherein the one or more processing devices are configured to execute the computer readable program code to:

receive an indication from a first user from an institution to log into an on-boarding application for on-boarding one or more entities to comply with the compliance regulations and to determine that the institution can enter into transactions with the one or more entities being on-boarded;

identify an on-boarding template for the on-boarding application;

determine first user profile data, wherein the first user profile data comprises at least a first user type and a first user style-sheet, wherein the first user type includes an entitlement type that indicates what the first user is approved to view and take actions on, and wherein the first user style-sheet includes how to display a plurality of on-boarding questions and pre-defined answers in an on-boarding interface to the first user;

display the on-boarding interface to the first user in a first user interface based on the first user type, and the first user style-sheet;

receive an entity selection from the first user to on-board an entity within the on-boarding interface;

receive a region in which the first user is on-boarding the entity, and wherein the region in which the first user is on-boarding the entity determines at least a portion of the compliance regulations;

determine a plurality of first on-boarding questions and pre-defined answers for on-boarding the entity based on the user profile data, the entity selection, and the region, wherein the plurality of questions and pre-defined answers for on-boarding the entity at least comprise product questions regarding products for which the institution is entering transactions with the entity, and wherein the plurality of questions and pre-defined answers for on-boarding the entity at least comprise regulatory questions related to if the entity is regulated by an agency and verification questions related to if the entity is a verified entity;

display the plurality of first on-boarding questions and pre-defined answers in the on-boarding interface based on the template;

receive an action from the first user that answers one or more of the plurality of first on-boarding questions;

store the answers to the one or more of the plurality of first on-boarding questions;

determine one or more second on-boarding questions and pre-defined answers based on the answers to one or more of the plurality of first on-boarding questions;

display the second one or more questions and pre-defined answers in the template in the on-boarding interface; and on-board the entity to allow the institution to enter into transactions with the entity when the pre-defined answers to the product questions and regulatory questions meet the compliance regulations.

2. The system of claim 1, wherein the one or more processing devices are further configured to execute the computer readable program code to:

receive an indication from a second user to log into the on-boarding application for on-boarding one or more entities;

identify the on-boarding template for the on-boarding application;

determine second user profile data, wherein the second user profile data comprises at least a second user type and a second user style-sheet, wherein the second user type includes an entitlement type that indicates what the second user is approved to view and take actions on, and wherein the second user style-sheet includes how to display the plurality of on-boarding questions and pre-defined answers in the on-boarding interface to the second user;

display the on-boarding interface to the second user based on the second user type and the second user style-sheet;

receive the entity selection from the second user to on-board the entity within the on-boarding interface;

display the plurality of first on-boarding questions and pre-defined answers, the second one or more questions and pre-defined answers, and the answers provided by the first user in the on-boarding interface based on the template;

receive an action from the second user that answers one or more of the plurality of first or second on-boarding questions, or approves the answers provided by the first user; and store the answers to one or more of the plurality of first or second on-boarding questions or the approval of the answers provided by the first user.

3. The system of claim 1, wherein the system further comprises:

one or more data storage databases for storing data files comprising:

a lookup data file comprising element data for display in user interfaces of a plurality of users;

a component data file comprising a data type identifying a type of the data in the lookup data file; and an entitlement data file comprising user types identifying entitlements of the plurality of users for viewing the data in the lookup data file;

a template database for storing a plurality of on-boarding templates for display in user interfaces;

a rules engine for determining data to display in the plurality of templates in the user interfaces;

a workflow engine for determining dissemination of the data to one or more users from the plurality of users throughout the institution;

a workflow storage database for storing actions taken by the one or more users from the plurality of users on the data; and a reporting engine or a data distribution engine for reporting the actions taken by one or more users from the plurality of users on the data or for providing statuses of the actions taken by the one or more users from the plurality of users on the data.

4. The system of claim 3, wherein the one or more processing devices configured to execute the computer readable program code to determine a plurality of first on-boarding questions and pre-defined answers comprises:

identifying the plurality of questions and pre-defined answers in the lookup data file;

identifying a pre-defined answer type in the component data file;

identifying user entitlements of the first user in the entitlement data file;

determining the plurality of first on-boarding questions and pre-defined answers based on the user entitlements of the first user in the data file and the first user type; and wherein displaying the plurality of first on-boarding questions and pre-defined answers in the on-boarding interface is based on the pre-defined answer type.

5. The system of claim 1, wherein the user profile data includes a language preference, wherein displaying the on-boarding interface to the first user further comprises displaying the on-boarding interface to the first user based on the language preference.

6. The system of claim 1, wherein the processing device is further configured to execute the computer readable program code to:
   receive documents for on-boarding the entity from the first user; and
   store the documents for satisfying the compliance regulations.

7. A computer program product for on-boarding entities to comply with compliance regulations utilizing an integration framework, the computer program product comprising at least one non-transitory computer-readable medium having computer-readable program code portions embodied therein, the computer-readable program code portions comprising:
   an executable portion configured to receive an indication from a first user from an institution to log into an on-boarding application for on-boarding one or more entities to comply with the compliance regulations and to determine that the institution can enter into transactions with the one or more entities being on-boarded;
   an executable portion configured to identify an on-boarding template for the on-boarding application;
   an executable portion configured to determine first user profile data, wherein the first user profile data comprises at least a first user type and a first user style-sheet, wherein the first user type includes an entitlement type that indicates what the first user is approved to view and take actions on, and wherein the first user style-sheet includes how to display a plurality of on-boarding questions and pre-defined answers in an on-boarding interface to the first user;
   an executable portion configured to display the on-boarding interface to the first user in a first user interface based on the first user type and the first user style-sheet;
   an executable portion configured to receive an entity selection from the first user to on-board an entity within the on-boarding interface;
   an executable portion configured receive a region in which the first user is on-boarding the entity, and wherein the region in which the first user is on-boarding the entity determines at least a portion of the compliance regulations;
   an executable portion configured to determine a plurality of first on-boarding questions and pre-defined answers for on-boarding the entity based on the user profile data, the entity selection, and the region, wherein the plurality of questions and pre-defined answers for on-boarding the entity at least comprise product questions regarding products for which the institution is entering transactions with the entity, and wherein the plurality of questions and pre-defined answers for on-boarding the entity at least comprise regulatory questions related to if the entity is regulated by an agency and verification questions related to if the entity is a verified entity;
   an executable portion configured to display the plurality of first on-boarding questions and pre-defined answers in the on-boarding interface based on the template;
   an executable portion configured to receive an action from the first user that answers one or more of the plurality of first on-boarding questions;
   an executable portion configured to store the answers to the one or more of the plurality of first on-boarding questions;
   an executable portion configured to determine one or more second on-boarding questions and pre-defined answers based on the answers to one or more of the plurality of first on-boarding questions;
   an executable portion configured to display the second one or more questions and pre-defined answers in the template in the on-boarding interface; and
   an executable portion configured to on-board the entity to allow the institution to enter into transactions with the entity when the pre-defined answers to the product questions and regulatory questions meet the compliance regulations.

8. The computer program product of claim 7, wherein the computer-readable program code portions further comprise:
   an executable portion configured to receive an indication from a second user to log into the on-boarding application for on-boarding one or more entities;
   an executable portion configured to identify the on-boarding template for the on-boarding application;
   an executable portion configured to determine second user profile data, wherein the second user profile data comprises at least a second user type and a second user style-sheet, wherein the second user type includes the entitlement type that indicates what the second user is approved to view and take actions on, and wherein the second user style-sheet includes how to display the plurality of on-boarding questions and pre-defined answers in the on-boarding interface to the second user;
   an executable portion configured to display the on-boarding interface to the second user based on the second user type and the second user style-sheet;
   an executable portion configured to receive the entity selection from the second user to on-board the entity within the on-boarding interface;
   an executable portion configured to display the plurality of first on-boarding questions and pre-defined answers, the second one or more questions and pre-defined answers, and the answers provided by the first user in the on-boarding interface based on the template;
   an executable portion configured to receive an action from the second user that answers one or more of the plurality of first or second on-boarding questions, or approves the answers provided by the first user; and
   an executable portion configured to store the answers to one or more of the plurality of first or second on-boarding questions or the approval of the answers provided by the first user.

9. The computer program product of claim 7, further comprising an executable portion configured to access:
   one or more data storage databases for storing data files comprising:
      a lookup data file comprising element data for display in user interfaces of a plurality of users;
      a component data file comprising a data type identifying a type of the data in the lookup data file; and
      an entitlement data file comprising user types identifying entitlements of the plurality of users for viewing the data in the lookup data file;
   a template database for storing a plurality of on-boarding templates for display in user interfaces;
   a rules engine for determining data to display in the plurality of templates in the user interfaces;

a workflow engine for determining dissemination of the data to one or more users from the plurality of users throughout the institution;

a workflow storage database for storing actions taken by the one or more users from the plurality of users on the data; and a reporting engine or a data distribution engine for reporting the actions taken by one or more users from the plurality of users on the data or for providing statuses of the actions taken by the one or more users from the plurality of users on the data.

10. The computer program product of claim 9, wherein the executable portion configured to determine a plurality of first on-boarding questions and pre-defined answers comprises:

an executable portion configured to identify the plurality of questions and pre-defined answers in the lookup data file;

an executable portion configured to identify a pre-defined answer type in the component data file;

an executable portion configured to identify user entitlements of the first user in the entitlement data file;

an executable portion configured to determine the plurality of first on-boarding questions and pre-defined answers based on the user entitlements of the first user in the data file and the first user type; and wherein the executable portion configured to display the plurality of first on-boarding questions and pre-defined answers in the on-boarding interface is based on the pre-defined answer type.

11. The computer program product of claim 7, wherein the user profile data includes a language preference, and wherein the executable portion configured to display the on-boarding interface to the first user further comprises an executable portion configured to display the on-boarding interface to the first user based on the language preference.

12. The computer program product of claim 7, wherein the computer-readable program code portions further comprise:

an executable portion configured to receive documents for on-boarding the entity from the first user; and an executable portion configured to store the documents for satisfying the compliance regulations.

13. A method for on-boarding entities to comply with compliance regulations utilizing an integration framework, the method comprising:

receiving, by one or more processing devices, an indication from a first user from an institution to log into an on-boarding application for on-boarding one or more entities to comply with the compliance regulations and to determine that the institution can enter into transactions with the one or more entities being on-boarded;

identifying, by the one or more processing devices, an on-boarding template for the on-boarding application;

determining, by the one or more processing devices, first user profile data, wherein the first user profile data comprises a first user type and a first user style-sheet, wherein the first user type includes an entitlement type that indicates what the first user is approved to view and take actions on, and wherein the first user style-sheet includes how to display a plurality of on-boarding questions and pre-defined answers in an on-boarding interface to the first user;

displaying, by the one or more processing devices, the on-boarding interface to the first user in a first user interface based on the first user type and the first user style-sheet;

receiving, by the one or more processing devices, an entity selection from the first user to on-board an entity within the on-boarding interface;

receiving, by the one or more processing devices, a region in which the first user is on-boarding the entity, and wherein the region in which the first user is on-boarding the entity determines at least a portion of the compliance regulations;

determining, by the one or more processing devices, a plurality of first on-boarding questions and pre-defined answers for on-boarding the entity based on the user profile data, the entity selection, and the region, wherein the plurality of questions and pre-defined answers for on-boarding the entity at least comprise product questions regarding products for which the institution is entering transactions with the entity, and wherein the plurality of questions and pre-defined answers for on-boarding the entity at least comprise regulatory questions related to if the entity is regulated by an agency and verification questions related to if the entity is a verified entity;

displaying, by the one or more processing devices, the plurality of first on-boarding questions and pre-defined answers in the on-boarding interface based on the template;

receiving, by the one or more processing devices, an action from the first user that answers one or more of the plurality of first on-boarding questions;

storing, by the one or more processing devices, the answers to the one or more of the plurality of first on-boarding questions;

determining, by the one or more processing devices, one or more second on-boarding questions and pre-defined answers based on the answers to one or more of the plurality of first on-boarding questions;

displaying, by the one or more processing devices, the second one or more questions and pre-defined answers in the template in the on-boarding interface; and on-boarding, by the one or more processing devices, the entity to allow the institution to enter into transactions with the entity when the pre-defined answers to the product questions and regulatory questions meet the compliance regulations.

14. The method of claim 13, wherein the method further comprises:

receiving, by the one or more processing devices, an indication from a second user to log into the on-boarding application for on-boarding one or more entities;

identifying, by the one or more processing devices, the on-boarding template for the on-boarding application;

determining, by the one or more processing devices, second user profile data, wherein the second user profile data comprises at least a second user type and a second user style-sheet, wherein the second user type includes the entitlement type that indicates what the second user is approved to view and take actions on, and wherein the second user style-sheet includes how to display the plurality of second on-boarding questions and pre-defined answers in the on-boarding interface to the second user;

displaying, by the one or more processing devices, the on-boarding interface to the second user based on the second user type and the second user style-sheet;

receiving, by the one or more processing devices, the entity selection from the second user to on-board the entity within the on-boarding interface;

displaying, by the one or more processing devices, the plurality of first on-boarding questions and pre-defined answers, the second one or more questions and pre-defined answers, and the answers provided by the first user in the on-boarding interface based on the template;

receiving, by the one or more processing devices, an action from the second user that answers one or more of the plurality of first or second on-boarding questions, or approves the answers provided by the first user; and storing, by the one or more processing devices, the answers to one or more of the plurality of first or second on-boarding questions or the approval of the answers provided by the first user.

15. The method of 13, further comprising accessing:

one or more data storage databases for storing data files comprising:

a lookup data file comprising element data for display in user interfaces of a plurality of users;

a component data file comprising a data type identifying a type of the data in the lookup data file; and an entitlement data file comprising user types identifying entitlements of the plurality of users for viewing the data in the lookup data file;

a template database for storing a plurality of on-boarding templates for display in user interfaces;

a rules engine for determining data to display in the plurality of templates in the user interfaces;

a workflow engine for determining dissemination of the data to one or more users from the plurality of users throughout the institution;

a workflow storage database for storing actions taken by the one or more users from the plurality of users on the data; and a reporting engine or a data distribution engine for reporting the actions taken by one or more users from the plurality of users on the data or for providing statuses of the actions taken by the one or more users from the plurality of users on the data.

16. The method of 15, wherein determining the plurality of first on-boarding questions and pre-defined answers comprises:

identifying, by the one or more processing devices, the plurality of questions and pre-defined answers in the lookup data file;

identifying, by the one or more processing devices, a pre-defined answer type in the component data file;

identifying, by the one or more processing devices, user entitlements of the first user in the entitlement data file;

determining, by the one or more processing devices, the plurality of first on-boarding questions and pre-defined answers based on the user entitlements of the first user in the data file and the first user type; and wherein displaying the plurality of first on-boarding questions and pre-defined answers in the on-boarding interface is based on the pre-defined answer type.

17. The method of claim 13, wherein the user profile data includes a language preference, and wherein displaying the on-boarding interface to the first user further comprises displaying the on-boarding interface to the first user based on the language preference.

18. The method of claim 13, wherein the method further comprises:

receiving, by the one or more processing devices, documents for on-boarding the entity from the first user; and storing, by the one or more processing devices, the documents for satisfying the compliance regulations.

\* \* \* \* \*